United States Patent [19]
Sato et al.

[11] 4,074,082
[45] Feb. 14, 1978

[54] COUPLING DEVICE BETWEEN TAPE RECORDER AND ATTACHMENT

[75] Inventors: Masanobu Sato, Hachioji; Shiro Kondo, Tama, both of Japan

[73] Assignee: Olympus Optical Co., Ltd., Tokyo, Japan

[21] Appl. No.: 690,529

[22] Filed: May 27, 1976

[30] Foreign Application Priority Data

June 5, 1975 Japan ............................ 50-76107[U]

[51] Int. Cl.² .................................................. G11B 31/00
[52] U.S. Cl. ................................ 179/100.11; 339/65; 339/92 R; 360/137; 325/311; 325/355; 325/356
[58] Field of Search ................. 179/100.11, 100.12 R, 179/100.12 A, 100.15; 325/311, 355, 356; 360/73, 137; 339/184 R, 92 R, 65, 66 R; 200/307

[56] References Cited

U.S. PATENT DOCUMENTS

| 2,983,795 | 5/1961 | Tateishi | 179/100.11 |
| 3,521,010 | 7/1970 | Sato | 360/137 |
| 3,582,965 | 6/1971 | DeMetrick | 360/137 |
| 3,796,984 | 3/1974 | Selinko | 325/356 |
| 3,916,122 | 10/1975 | Sato | 179/100.11 |
| 3,934,267 | 1/1976 | Kosaka | 360/137 |
| 3,988,724 | 10/1976 | Anderson | 325/355 |

Primary Examiner—Bernard Konick
Assistant Examiner—Alan Faber
Attorney, Agent, or Firm—Ostrolenk, Faber, Gerb & Soffen

[57] ABSTRACT

A coupling device is provided for detachably coupling a tape recorder with an attachment such as a battery housing, an AC adaptor, a radio tuner, a tape speed control unit or the like. The coupling device includes a recessed engaging portion and a projecting engaging portion formed on the mating surfaces of the tape recorder and the attachment and having tapered or bevelled surfaces in order to prevent any rattling between the two units.

6 Claims, 11 Drawing Figures

COUPLING DEVICE BETWEEN TAPE RECORDER AND ATTACHMENT

BACKGROUND OF THE INVENTION

The invention relates to a coupling device between a tape recorder and an attachment, and more particularly to a coupling device for detachably coupling a small size tape recorder with an attachment such as a battery housing, an AC adaptor, a tape speed changer, a radio tuner or the like.

For a small size tape recorder, it is desirable to minimize the overall size for facilitating the convenience of portable use. For this reason, the body of the tape recorder contains a minimum number of components which are essential to the operation thereof. To provide added flexibility in the use of such a tape recorder, an attachment is externally coupled with a tape recorder in a detachable manner. Usually, the attachment is coupled with a mating surface of the tape recorder with a single mounting screw. However, such form of coupling involves difficulty in aligning the abutting surfaces because the single screw is utilized to couple both members. Specifically, the units tend to rotate about the single screw, which prevents an accurate alignment between the opposing abutting surfaces. Thus, it is evident that there is a need for the provision of some anti-rotation mechanism.

On the other hand, the casing of the tape recorder and the attachment is usually molded from a synthetic resin material in order to reduce the cost, and thus their mating surfaces are also formed by molded resin surfaces.

It is to be noted that the individual mating surfaces of the tape recorder and the attachment include a plurality of electrically interconnecting terminals disposed therein so that they can engage each other when the units are coupled together so as to provide an electrical interconnection between the electrical circuit of the tape recorder and the electrical circuit of the attachment.

When the attachment comprises a radio tuner, the attachment is coupled with the tape recorder so as to form a radio set by utilizing an amplifier, a loudspeaker and a power source which are contained within the recorder, and also to enable a signal intercepted by the tuner to be recorded by the tape recorder. However, the use of the power source contained in the tape recorder in such a combination presents several difficulties. Specifically, in a conventional construction, the tuner is turned on by operating a power switch which is provided on the part of the tuner, independently of the condition of use of the tape recorder. However, a user frequently forgets that he has turned on the tuner and leaves it on for a prolonged period of time without operating the recorder, thus wastefully dissipating the portable power source contained in the tape recorder. This is because a conventional tuner is only part of a receiver which becomes complete only when it is combined with a part of the recorder circuit, but cannot function as a receiver when the tape recorder is inoperative. A degree of attention is required of a user, when the power switch represents a small component, in recognizing the position of the power switch in order to confirm that the tuner is in standby condition.

As another aspect, it is recognized that the tape speed during a record/playback operation of the tape recorder be maintained constant. Usually a constant speed control circuit is internally housed within the tape recorder to prevent a variation in the rotational speed of an internally housed motor. However, when transcribing from a recorded tape being reproduced, the usual running speed for such an operation may be too rapid to permit such a transcribing operation. Conversely, when it is desired to grasp the point of a subject contained in a recorded tape, it may be desirable to feed the tape at a more rapid rate. It is obvious that a conventional tape running device cannot be utilized to satisfy these requirements. While it may be desirable to internally house a tape speed changer within the tape recorder, it is difficult, if not impossible, to achieve this without an accompanying compromise in the size of the small size tape recorder.

SUMMARY OF THE INVENTION

It is a principal object of the invention to provide a coupling device between a tape recorder and an attachment, therefore both of which include molded mating surfaces which are provided with a recessed engaging portion and a projecting engaging portion which are molded so as to prevent a relative rotation therebetween, thus facilitating a coupling operation and avoiding any rattling therebetween.

It is another object of the invention to provide a radio tuner which may be utilized as an attachment to a tape recorder so as to be effectively driven by a power source contained in the latter and having a tapered or bevelled engaging portion in its mating surface with the tape recorder so as to be capable of properly indicating to the user when the tuner is in standby or energized condition.

It is a further object of the invention to provide a tape speed control device which may be utilized as an attachment to a tape recorder and having a tapered or bevelled engaging portion in its mating surface with the tape recorder and capable of adjusting the rotational speed of a tape driving motor which is internally housed within the tape recorder to any desired value.

In accordance with the invention, a tape recorder and an attachment are each formed with a molded mating surface, which is integrally formed with a recessed engaging portion and a projecting engaging portion each having a tapered or bevelled surface. The provision of such a recess and projection may be achieved by an integral molding operation of the respective mating surfaces, thus dispensing with any particular part for preventing a relative rotation therebetween and enabling the coupling device to be inexpensively produced. In addition, a proper indication is given to the user when the radio tuner is in its standby or energized condition. Additionally, a tape speed changer may be formed as an attachment.

DETAILED DESCRIPTION OF PREFERRED EMBODIMENTS

Referring to FIGS. 1 to 4, there are shown several embodiments in which a miniature cassette type tape recorder is combined with a battery housing which is formed as an attachment.

Figure 1:
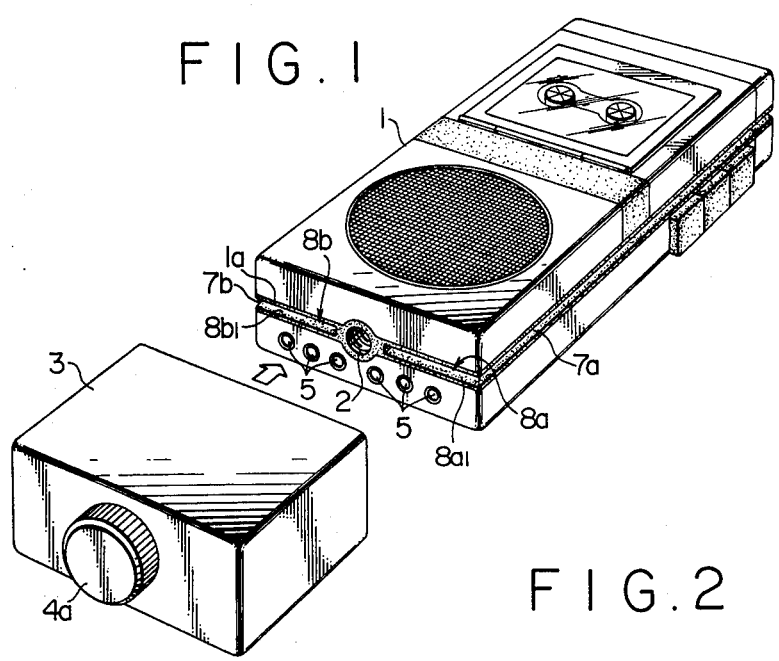
FIG. 1 is a perspective view of the coupling device between tape recorder and attachment which is constructed in accordance with one embodiment of the invention.

As shown in FIG. 1, a miniature cassette tape recorder 1 includes a bottom surface which is formed as a mating surface 1a and which is centrally formed with a threaded bore 2, adapted to threadedly receive a single mounting screw 4 (see FIG. 2) extending through a battery box or attachment 3, thus enabling the attachment 3 to be united with the tape recorder 1.

The mating surface 1a is molded from a synthetic resin material, and has a plurality of electrically connecting terminals 5 formed therein which are aligned in a row at a position below the threaded bore 2. Each of the terminals 5 is adapted to receive and contact a corresponding one of a plurality of electrically connecting terminals 6 (see FIG. 2) which are provided on a mating surface 3a of the attachment 3 when the latter is coupled with the tape recorder. When the electrical interconnection is achieved in this manner, an electrical output from a power source such as dry cells or a battery contained in the attachment 3 is supplied to the circuit of the tape recorder 1. The lateral side surfaces of the tape recorder 1 is formed with grooves 7a, 7b for slidable connection with another electronic instrument such as a small size radio set.

In the present embodiment, the grooves 7a, 7b are extended to the proximity of the threaded bore 2 in the bottom surface, thus forming recessed engaging portions 8a, 8b on the left- and right-hand sides of the bore 2.

Figure 2:
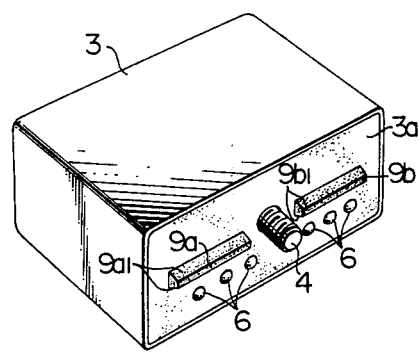
FIG. 2 is a perspective view of the attachment shown in FIG. 1.

As shown in FIG. 2, the mating surface 3a of the attachment 3 is also molded from a synthetic resin material and is formed with projecting engaging portions 9a, 9b in the form of tabs which are located on the opposite sides of the mounting screw 4 which centrally projects from this surface. The projecting engaging portions 9a, 9b are integrally molded on the mating surface 3a, and are disposed for engagement with the recessed engaging portions 8a, 8b when the mating surface 3a is disposed in abutment against the mating surface 1a of the tape recorder 1. It will be noted that the projecting engaging portions 9a, 9b are tapered, forming bevelled upper and lower surfaces 9a1, 9b1. The recessed engaging portions 8a, 8b are also tapered in a corresponding manner to conform to the bevelled surfaces 9a1, 9b1 of the projecting engaging portions 9a, 9b, with the recesses being formed with bevelled surfaces 8a1, 8b1 which are tapered toward the bottom thereof.

Figure 3:
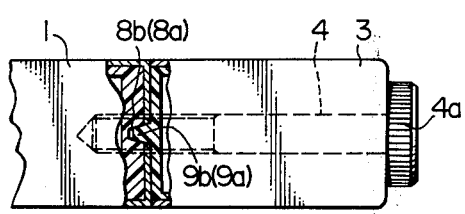
FIG. 3 is a side elevation, partly in section, of the coupling device shown in FIG. 1.

With the coupling device thus constructed, when the attachment 3 is to be coupled with the tape recorder 1, the mating surface 3a is disposed opposite to and then brought into abutment against the mating surface 1a of the recorder 1, whereupon the projecting engaging portions 9a, 9b engage with the recessed engaging portions 8a, 8b, respectively. Then a head 4a (see FIGS. 1 and 3) of the mounting screw 4 which rotatably extends through the attachment 3 may be turned to screw it into the threaded bore 2, thereby achieving a tight engagement between the bevelled surfaces of the respective engaging portions and preventing a misalignment between the mating surfaces 1a, 3a. FIG. 3 illustrates a tight engagement achieved between the bevelled surfaces 8a1, 8b1 of the recessed engaging portions 8a, 8b and the bevelled surfaces 9a1, 9b1 of the projecting engaging portions 9a, 9b. In this manner, the attachment 3 can be coupled with the tape recorder 1 in a rapid and simple manner, and the engagement between the recessed and projecting engaging portions prevents any relative rotation between the attachment 3 and the recorder 1 about the mounting screw 4. In addition, the engagement between the bevelled surfaces of the respective engaging portions advantageously prevents any slight rattling between the two units.

Figure 4:
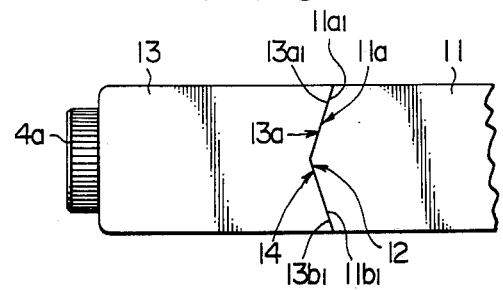
FIG. 4 is a side elevation of the coupling device between a tape recorder and an attachment which is constructed in accordance with another embodiment of the invention.

In the embodiment described above, the mating surfaces 1a, 3a have been partly formed with recessed and projecting engaging portions, which however may extend over the entire mating surfaces as illustrated in FIG. 4. Referring to FIG. 4, a tape recorder 11 has a mating surface 11a which is in the form of a projection having a pair of bevelled surfaces 11a1, 11b1, thus constituting a projecting engaging portion 12. On the other hand, an attachment 13 has a mating surface 13a which is in the form of a recessed engaging portion 14 having a pair of bevelled surfaces which are recessed in a manner corresponding to the projecting engaging portion 12. This arrangement also prevents any relative movement as well as any rattling between the units by virtue of the cooperation between the recessed and projecting engaging portions 12, 14.

In the arrangements described above, the recessed engaging portions 8a, 8b, 14 and the projecting engaging portions 9a, 9b, 12 may be formed in or on any surface of the respective units.

Figure 5:
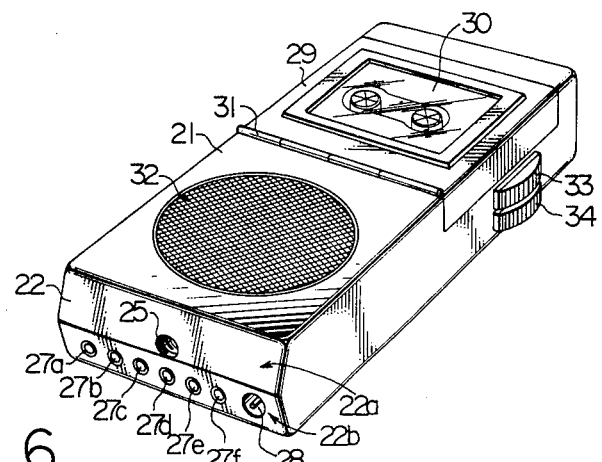
FIG. 5 is a perspective view of a tape recorder to which the invention is applied.
Figure 6:
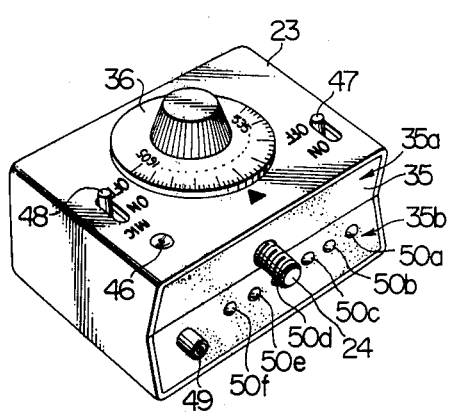
FIG. 6 is a perspective view of a radio tuner as an attachment which is adapted to be coupled with the tape recorder shown in FIG. 5 and to which the invention is applied.

FIG. 5 shows a miniature tape recorder 21 of cassette type to which the coupling means according to the invention is applied so as to be detachably coupled with an attachment shown in FIG. 6 which is illustrated as a radio tuner 23.

The bottom surface of the tape recorder 21 is formed as a mating surface 22, which is provided with a pair of bevelled surfaces 22a, 22b, functioning as a projecting engaging portion as in the embodiment shown in FIG. 4. The surface 22a is centrally formed with a threaded bore 25 for threadably receiving the free end of a mounting screw 24 (see FIG. 6) which is rotatably carried by the tuner 23 and extending therethrough. The lower bevelled surface 22b is provided with a plurality of electrically connecting terminals 27a to 27f which are disposed in a row, and is also provided with a power supply connecting jack 28 which is located to the right-hand side of the terminal 27f, as viewed in FIG. 5.

These terminals as the means for providing an electrical interconnection between the circuit of the tape recorder 21 and the circuit of the tuner 23. The recorder includes a top cover 29 of a cassette receiving chamber and in which a transparent window 30 is formed for permitting an observation of the tape running. The cover is mounted on the body of the recorder by means of a hinge 31. In addition, the recorder includes a loudspeaker which is contained behind a grille 32, and a record actuating button 33 and a playback actuating button 34.

The tuner 23 shown in FIG. 6 has a mating surface 35 which, as in the previous embodiment, is formed with a pair of bevelled surfaces 35a, 35b, forming a recessed engaging portion. The free end of the mounting screw 24 projects centrally through the bevelled surface 35a, and the screw is rotatably mounted in the tuner 23. The screw 24 extends through the tuner, and has a turning head 24a (see FIG. 7) exposed on the outer surface of the tuner which is located opposite to the mating surface 35. The screw can be turned by rotating the head 24a.

The lower bevelled surface 35b is formed with a plurality of electrical connecting terminals 50a to 50f which are disposed in a row so that they can engage the terminals 27a to 27f to provide an electrical interconnection between the tuner and the recorder when the mating surfaces 22 and 35 are coupled together. In addition, the bevelled surface 35b is provided with a plug 49 which is located adjacent to the terminal 50f for cooperative engagement with the jack 28 (see FIG. 5) which is provided on the recorder.

A tuning dial 36 is mounted on the top surface of the casing of the tuner 23, on which are also disposed a change-over switch 48 for switching a microphone internally housed within the tape recorder 21 between an operative and an inoperative position, a switch 47 for connecting an internal power source within the tape recorder 21 with the electrical circuit of the tuner 23, and an indicator element 46 which is illuminated when the power source within the recorder 21 is electrically connected with the circuit of the tuner 23.

Figure 8:
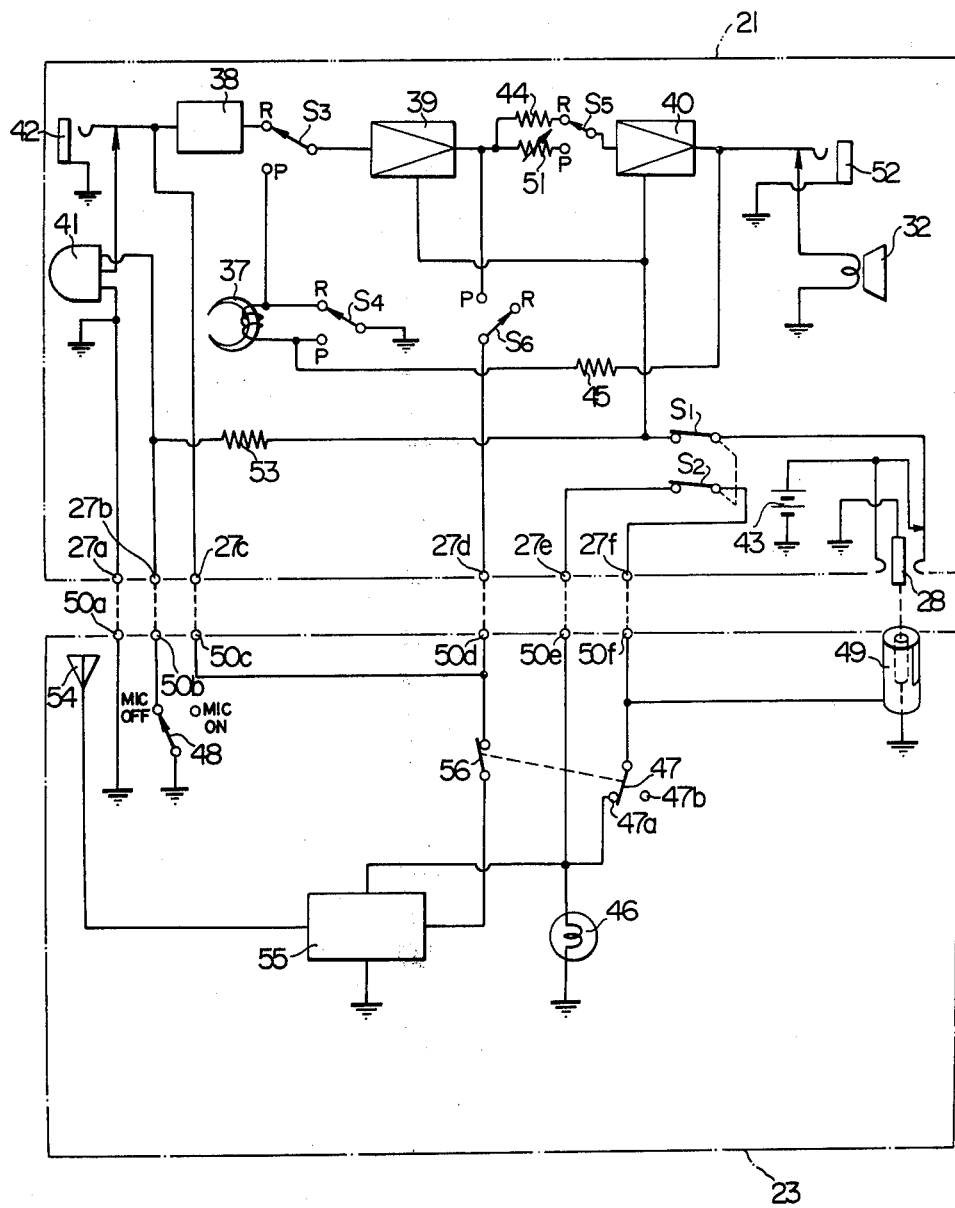
FIG. 8 is a circuit diagram of the tape recorder and the radio tuner shown in FIG. 7.

By way of example, FIG. 8 shows the electrical circuit of the miniature cassette tape recorder 21 and the radio tuner 23 mentioned above. Specifically, the tape recorder 21 comprises an electrical circuit which is delineated by a block shown in double dot chain line. Essentially, the electrical circuit of the recorder 21 comprises a record/playback magnetic head 37, an AGC circuit (automatic gain control) 38, amplifiers 39, 40, a loudspeaker 32, an internally housed microphone 41, a jack 42 for connection with an external microphone and a power supply 43. The circuit also includes a pair of mechanically interlocked power switches S1, S2 and change-over switches S3 to S6 which are operated in response to an operation of the record or playback actuating buttons 33 and 34. In the record mode, the change-over switches S3 to S6 have their movable contact thrown to associated stationary terminals designated R, as shown. In this position of the change-over switches, any input signal to be recorded which is produced by an external microphone (not shown) connected with the jack 42 or by the internally housed microphone 41 will be fed through the AGC circuit 38 and switch S3 to be amplified by the amplifier 39, and is then fed through a resistor 44 and switch S5 to be additionally amplified by the amplifier 40 before being applied to the magnetic head 37 through a resistor 45.

During the playback mode, the movable contact of the change-over switches S3 to S6 are thrown to stationary terminals designated P, whereby an output signal reproduced by the magnetic head 37 will be applied to the amplifier 39 through the switch S3 and thence fed through a variable resistor 51 and switch S5 to the amplifier 40 for being supplied to the loudspeaker 32 through an earphone jack 52. The variable resistor 51 represents a volume control.

The described circuit is fed from the internally housed power supply 43. Specifically, a voltage output from the supply 43 is fed through the jack 28 (see FIG. 5) and power switch S1 to be applied to the amplifiers 39, 40, and is also fed through a resistor 53 to the positive terminal of the internally housed microphone 41.

The terminal 27a is connected with a grounded, negative voltage terminal of the microphone 41; the terminal 27b is connected with a positive voltage terminal of the microphone 41; the terminal 27c is connected with the input of the AGC circuit 38; the terminal 27d is connected with the movable contact of the switch S6; and the terminals 27e and 27f are connected across the power switch S2 which is interlocked with the power switch S1.

The electrical circuit of the tuner 23 is contained in a block which is shown by a single dot chain line. Essentially, the circuit comprises a tuner circuit 55, a switch 47, a change-over switch 48, a plug 49 and an indicator element 46 which indicates when the power supply connection is completed. The terminals 50a to 50f of the tuner are connected with this circuit in the following manner: the terminal 50a is grounded; the terminal 50b is connected with MIC OFF terminal of the change-over switch 48; the terminals 50c and 50d are connected together and selectively connected with the output of the tuner circuit 55 through a switch 56 which is mechanically interlocked with the switch 47; the terminal 50e is connected with one stationary terminal 47a of the switch 47; and the terminal 50f is connected with the plug 49 and also with the movable contact of the switch 47. The other stationary terminal 47b of the switch 47 is an idle terminal, and when the movable contact is thrown to the stationary terminal 47a, the voltage output from the supply 43 is applied to the tuner circuit 55. The indicator element or lamp 46 is connected between the stationary terminal 47a and the ground for indicating that the power supply connection is completed. The switch 47 is adapted to be connected in shunt with the power switch S2 which is connected with the terminals 27e and 27f provided on the part of the tape recorder 21.

Figure 7:
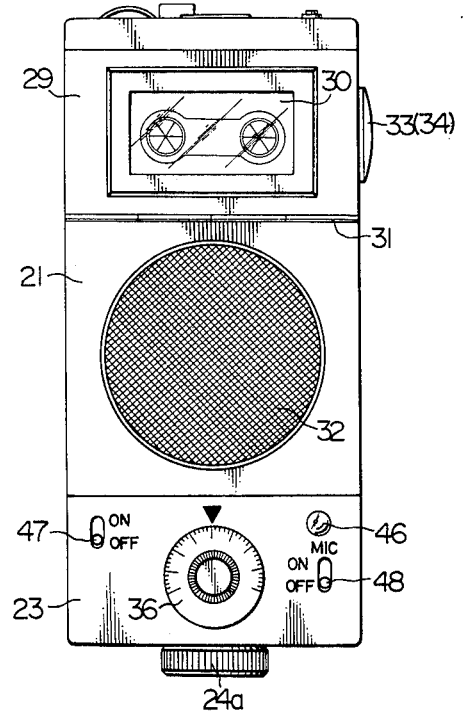
FIG. 7 is a plan view of the combination of the tape recorder of FIG. 5 with the radio tuner of FIG. 6.

When coupling the tuner 23 with the recorder 21, the mating surfaces 22, 35 are disposed in abutting relationship, and the head 24a of the mounting screw 24 is turned to threadably engage with the threaded bore 25. Thereupon a complete alignment is achieved between the mating surfaces 22, 35, as shown in FIG. 7, by virtue of their particular complementary shape illustrated in FIGS. 5 and 6. Simultaneously an electrical interconnection is respectively achieved between the terminals 50a to 50f of the tuner 23 and the terminals 27a to 27f of the recorder 21. Additionally, the plug 49 fits into the jack 28, thereby connecting the terminal 50f with the power supply 43 contained in the recorder 21. In this coupled condition, when the switch 47 is turned on by throwing the movable contact to the stationary terminal 47a, the power supply 43 is electrically connected with the tuner circuit 55 and the indicator element 46, so that the element 46 is illuminated, indicating that the tuner 23 is energized and hence operative. By establishing a playback mode of the tape recorder 21 and closing the power switches S1, S2, the combination of the tuner 23 and the recorder 21 can be effective as a radio set by feeding an output from the tuner circuit 55 through switch 56, terminals 50d, 27d and switch S6 to the amplifier 40, thereby actuating the loudspeaker 32. Obviously, no tape cassette is loaded on the tape recorder, and the magnetic head 37 remains in its idle condition.

If the power switches S1, S2 of the recorder 21 are closed without closing the switch 47 of the tuner 23, the electrical connection of the power supply 43 with the indicator element 46 is completed, whereby the latter element is illuminated, indicating that the tuner 23 is fed from the power supply 43. In this manner, an indication is properly given to a user that the tuner is in its standby or energized condition.

Figure 9:
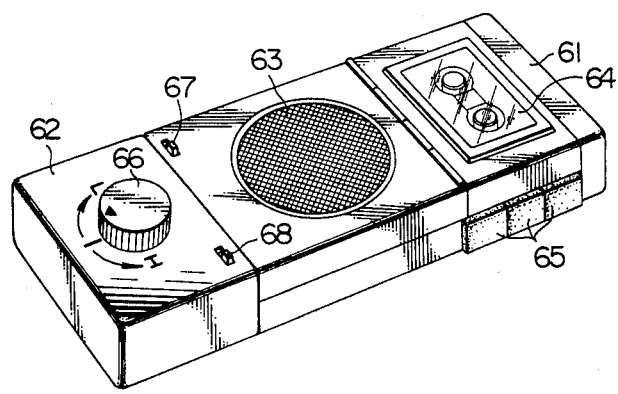
FIG. 9 is a perspective view of a combination of tape recorder and tape speed changer as an attachment which are constructed with the invention, both units being illustrated in the coupled condition.

FIG. 9 is a perspective view of a tape speed changer formed as an attachment having the coupling means of the invention, and which is detachably coupled with a portable, miniature cassette tape recorder. The recorder 61 is provided with a loudspeaker which is mounted behind a grille 63 situated substantially midway along the top surface thereof, and is also formed with a tape cassette receiving chamber which is closed by a hinged lid 64. In addition, a plurality of buttons 65 for selectively actuating a record, playback or stop operation are mounted on one lateral side of the recorder 61. Detachably coupled with the left-hand end face or bottom face of the tape recorder 61 is a tape speed changer 62 having a conforming configuration in a manner to complete an electrical interconnection therebetween.

The changer 62 is centrally provided with a speed adjusting knob 66 which is located on the top surface thereof, and can be turned to vary the resistance of a resistor 69 (see FIGS. 10 and 11) which is contained in its internal electrical circuit. When the knob 66 is turned in the direction of an arrow L, the resistance of the resistor 69 increases to reduce the rotational speed of the motor while turning the knob in the direction of an arrow H decreases the resistance of the resistor 69 to increase the rotational speed of the motor. In FIG. 9, numerals 67 and 68 respectively represent knobs which control the operation of switches S7, S8 as will be described later. The electrical circuit completed by coupling the tape speed changer 62 with the tape recorder 61 will be described with reference to the circuit diagrams of FIGS. 10 and 11.

In these Figures, it is assumed that electrical connecting terminals 61a, 61b provided on the recorder 61 are electrically connected with electrical connecting terminals 62a, 62b provided on the part of the speed changer 62 when the latter is coupled with the recorder 61. Though the tape recorder 61 includes a number of various electrical circuits, they are not specifically shown since they have no direct bearing with the present invention. The recorder includes a motor M having its negative terminal connected with the negative pole of a source battery E and having its positive terminal connected with the movable contact S7a of a switch S7 having a pair of stationary contacts S7b and S7c. The contact S7c is connected with the positive pole of the battery E through a motor voltage amplifier circuit 71 and a main switch S0 which is interlocked with the operation of a button provided on the tape recorder. The movable contact S7a can also be connected with the positive pole of the battery E through the stationary contact S7b, the terminals 61a, 62a, one stationary contact S8c of a switch S8, its movable contact S8a, a motor voltage amplifier circuit 73 which serves as the speed adjustment, and the terminals 62b, 61b. The aforementioned resistor 69 is contained in the amplifier circuit 73, and a motor speed control circuit 72 is connected across the series combination of the motor M, switch S7 and motor voltage amplifier circuit 71 for controlling the motor to its rated speed.

Figure 10:
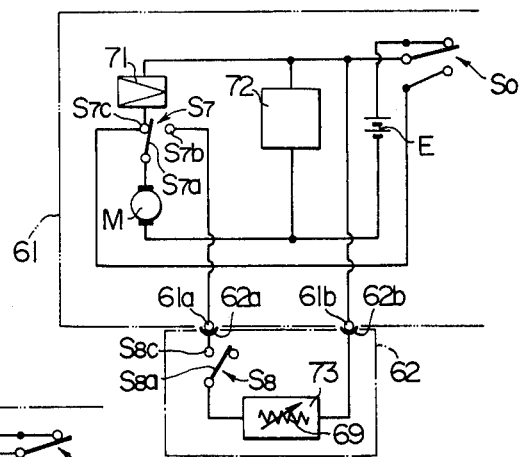
FIGS. 10 and 11 are circuit diagrams of the tape recorder and the tape speed changer shown in FIG. 9, with only the essential part of the electrical circuits being shown.

In FIG. 10, the movable contact S7a of the switch S7 is thrown to the stationary contact S7c by operation of the knob 67 (see FIG. 9), and the other stationary contact S7b remains disconnected from the circuit, so that the tape speed changer 62 is in its inoperative condition. The motor M is driven at a particular rotational speed established by the amplifier circuit 71 and which is maintained in a stable manner by the function of the control circuit 72.

Figure 11:
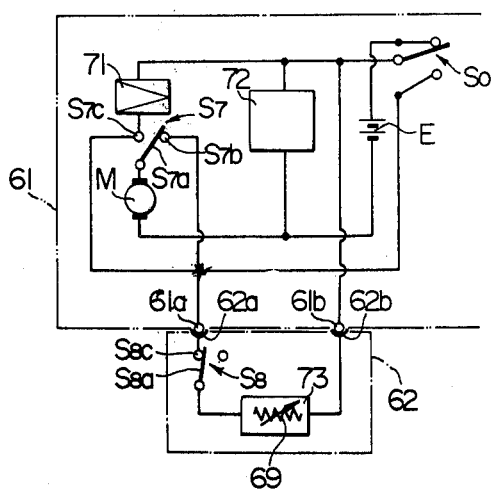

When the knobs 67 and 68 (see FIG. 9) associated with the switches S7, S8, respectively, are operated to throw these switches to their other positions as shown in FIG. 11, the movable contact S7a of the switch S7 engages the stationary contact S7b and the movable contact S8a of the switch S8 engages the stationary contact S8c. At this time, the electrical connection of the negative terminal of the motor M remains unchanged while its positive terminal is connected with the positive pole of the battery E through a circuit which includes the movable contact S7a of the switch S7, its stationary contact S7b, the terminals 61a, 62a, the stationary contact S8c of the switch S8, its movable contact S8a, the motor voltage amplifier circuit 73 containing the variable resistor 69, and terminals 62b, 61b. Thus the amplifier circuit 71 contained within the tape recorder is disconnected from the motor circuit.

The resistance of the resistor 69 contained in the speed changer 62 can be changed by turning the speed adjusting knob 66 (see FIG. 9) in either direction, thereby changing the magnitude of the current fed to the motor M, and hence the rotational speed thereof. The control circuit 72 is again effective to maintain the rotational speed established by the resistor 69.

What is claimed is:

1. A coupling device between a tape recorder and an attachment therefore comprising a mating surface on the tape recorder on which a plurality of electrical connecting terminals are provided for connecting an electrical circuit of an tape recorder with the electrical circuit of the attachment, a mating surface on the attachment adapted to be detachably coupled with a mating surface on the tape recorder, the mating surface on the attachment being provided with a plurality of electrical connecting terminals which are located thereon in a manner corresponding to the position of a plurality of terminals provided on the mating surface of the tape recorder, said pair of mating surfaces comprising respective, abutting whole edges of the tape recorder and the attachment, said mating surfaces each having a common ridge that runs along the length of the respective mating surfaces, wherein said mating surfaces have a pair of inclined surfaces in obtuse angle around their common ridge, respectively; in a manner of complementing with each other, to form a projecting engaging portion and a recessed engaging portion on the respective mating surfaces.

2. A coupling device according to claim 1 in which the projecting and recessed engaging portions are molded from a plastic material.

3. A coupling device according to claim 1 in which the tape recorder and the attachment are integrally coupled together by threadably engaging a screw which is rotatably mounted on the attachment into the tape recorder.

4. A coupling device according to claim 1 in which the attachment comprises a radio tuner including a switch which is adapted, when the tuner is coupled with the tape recorder, to be connected in shunt with a switch which is interlocked with a power switch of the tape recorder, and an indicator element which is illuminated when the switch of the tuner or the interlocked switch is closed for indicating a power supply connection between the radio tuner and the tape recorder.

5. A coupling device according to claim 4 in which the indicator element comprises a lamp.

6. A coupling device according to claim 1 in which the attachment comprises a tape speed changer which is adapted to be connected with a tape drive motor within the tape recorder when the changer is coupled with the tape recorder, thereby externally controlling the rotational speed of the motor.

* * * * *